(12) United States Patent  (10) Patent No.: US 7,508,103 B2
Watkins et al.  (45) Date of Patent: Mar. 24, 2009

(54) ELECTRIC MACHINE HAVING A TILTED VOLTAGE ADJUSTMENT

(75) Inventors: William J. Watkins, Tipp City, OH (US); Chih M. Lin, Tipp City, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 377 days.

(21) Appl. No.: 11/343,830

(22) Filed: Jan. 31, 2006

(65) Prior Publication Data

US 2007/0176500 A1  Aug. 2, 2007

(51) Int. Cl.
H02K 11/00 (2006.01)
H01R 27/00 (2006.01)
(52) U.S. Cl. .................. 310/71; 318/770; 439/217
(58) Field of Classification Search .............. 310/71; 318/770
See application file for complete search history.

(56) References Cited

U.S. PATENT DOCUMENTS

| | | | |
|---|---|---|---|
| 2,460,415 A | | 2/1949 | Gaylord et al. |
| 2,619,621 A | * | 11/1952 | Brown .................. 318/753 |
| 3,210,578 A | * | 10/1965 | Sherer .................. 310/71 |
| 3,231,767 A | * | 1/1966 | Powell .................. 310/71 |
| 3,983,428 A | * | 9/1976 | Bitsch et al. ........... 310/71 |
| 4,937,482 A | * | 6/1990 | Dohogne ............... 310/71 |
| 5,006,742 A | | 4/1991 | Strobl et al. |
| 5,091,611 A | | 2/1992 | Reeves et al. |
| 5,370,550 A | * | 12/1994 | Alwine et al. ........... 439/352 |
| 5,543,671 A | * | 8/1996 | Williams ............... 310/71 |
| 6,040,646 A | | 3/2000 | Peters |
| 6,048,219 A | * | 4/2000 | Kotowski ............... 439/221 |
| 6,106,324 A | | 8/2000 | Kwapien et al. |
| 6,133,658 A | * | 10/2000 | Fisher et al. ............ 310/89 |
| 6,657,339 B2 | | 12/2003 | Herndon et al. |
| 2004/0195923 A1 | | 10/2004 | Staigl, III et al. |

FOREIGN PATENT DOCUMENTS

DE  1057198  5/1959
DE  1057198 B  5/1959

\* cited by examiner

*Primary Examiner*—Burton Mullins
(74) *Attorney, Agent, or Firm*—Michael Best & Friedrich LLP

(57) ABSTRACT

A terminal board includes an attachment portion engageable with an end cap and defines an attachment plane that is substantially parallel to an end plane defined by the end cap, and a first terminal portion adapted to receive a first terminal wire. The first terminal portion defines a first terminal plane that intersects the end plane to define an included angle. The included angle is between about 40 degrees and 80 degrees.

8 Claims, 5 Drawing Sheets

ELECTRIC MACHINE HAVING A TILTED VOLTAGE ADJUSTMENT

BACKGROUND

The invention relates to a terminal block that includes terminals and a voltage change device. More specifically, the invention relates to a terminal block that includes terminals and a voltage change device that are tilted with respect to an end cap.

SUMMARY

In one embodiment, the invention provides a terminal board for an electric machine having an end cap defining an end plane, a first winding operable at a first voltage, and a second winding operable at a second voltage different from the first voltage. The terminal board includes an attachment portion engageable with the end cap and defining an attachment plane that is substantially parallel to the end plane, and a first terminal portion adapted to receive a first terminal wire. The first terminal portion defines a first terminal plane that intersects the end plane to define an included angle. The included angle is between about 40 degrees and 80 degrees.

In another embodiment, the invention provides a terminal board for an electric machine having an end cap defining an end plane, a first winding operable at a first voltage, and a second winding operable at a second voltage different from the first voltage. The terminal board includes an attachment portion engageable with the end cap and defining an attachment plane that is substantially parallel to the end plane, and a voltage adjustment portion coupled to the attachment portion. A voltage adjustment member is coupled to the voltage adjustment portion and is movable between a first position and a second position to switch the motor from the first winding to the second winding. A lock member is coupled to the voltage adjustment member and is operable to emit an audible sound when the voltage adjustment member is moved from the second position to the first position.

In yet another construction, the invention provides an electric machine including a rotor and a stator having a first winding and a second winding. The rotor is positioned adjacent the stator and is rotatable in response to the application of a voltage to at least one of the first winding and the second winding. The electric machine also includes a housing surrounding at least a portion of the stator and including an end cap that defines an end plane, and a terminal board coupled to the end cap. The terminal board includes a first terminal portion and a second terminal portion. A voltage adjustment portion is formed as part of the terminal board and defines a voltage adjustment plane that is not parallel to the end plane. A voltage adjustment member is coupled to the voltage adjustment portion and is movable between a first position in which the first terminal portion and the second terminal portion are electrically connected to the first winding, and a second position in which the first terminal portion and the second terminal portion are connected to the second winding.

Other aspects and embodiments of the invention will become apparent by consideration of the detailed description and accompanying drawings.

BRIEF DESCRIPTION OF THE DRAWINGS

The detailed description particularly refers to the accompanying figures in which.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings. In addition, where a method, process, or listing of steps is provided, the order in which the method, process, or listing of steps is presented should not be read as limiting the invention in any way.

Figure 1:
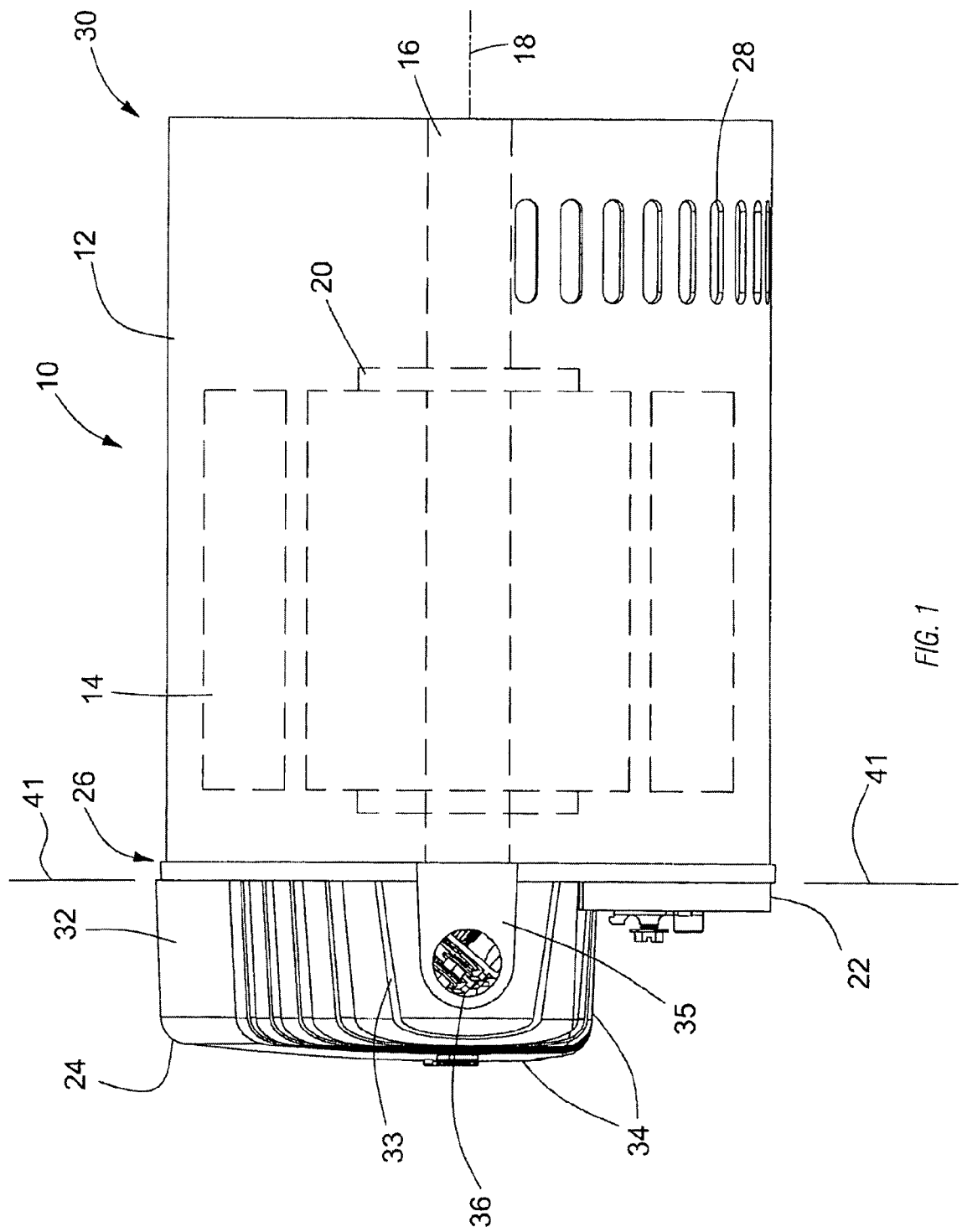
FIG. 1 is an elevation view of a motor including the invention.

FIG. 1 shows an electric motor 10 including a housing 12, a stator 14 fixed relative to the housing 12, a shaft 16 rotatable relative to the housing 12 (via one or more bearings) about an axis 18, and a rotor 20 fixedly connected to the shaft 16 for rotation relative to the stator 14. The housing 12 includes an end frame 22, a canopy 24 attached to a first end 26 of the end frame 22, and air vents 28 on a second end 30 of the end frame 22. The canopy 24 defines a peripheral surface 32 having a recess 33 and two surfaces 34 substantially perpendicular to each other. The end frame 22 includes a protrusion 35 that extends parallel to the rotational axis 18 of the rotor 20 and defines a circular opening 36 that allows access for electrical connectors (not shown). The position of the canopy 24 with respect to the end frame 22 is defined by fitting the protrusion 35 in the recess 33 of the canopy 24. In other constructions, the position of the canopy 24 with respect to the end frame 22 can be defined by other means.

The end frame 22 includes a recess (not shown) defined by a pair of walls that contact the canopy 24 but provide for access to the shaft 16 without the removal of the canopy 24. The walls are arranged to inhibit the entry of water or other unwanted substances into the space covered by the canopy 24, while allowing for the passage of tools (e.g., wrench, screwdriver, etc.) that can engage the shaft 16 without removing the canopy 24.

Figure 2:
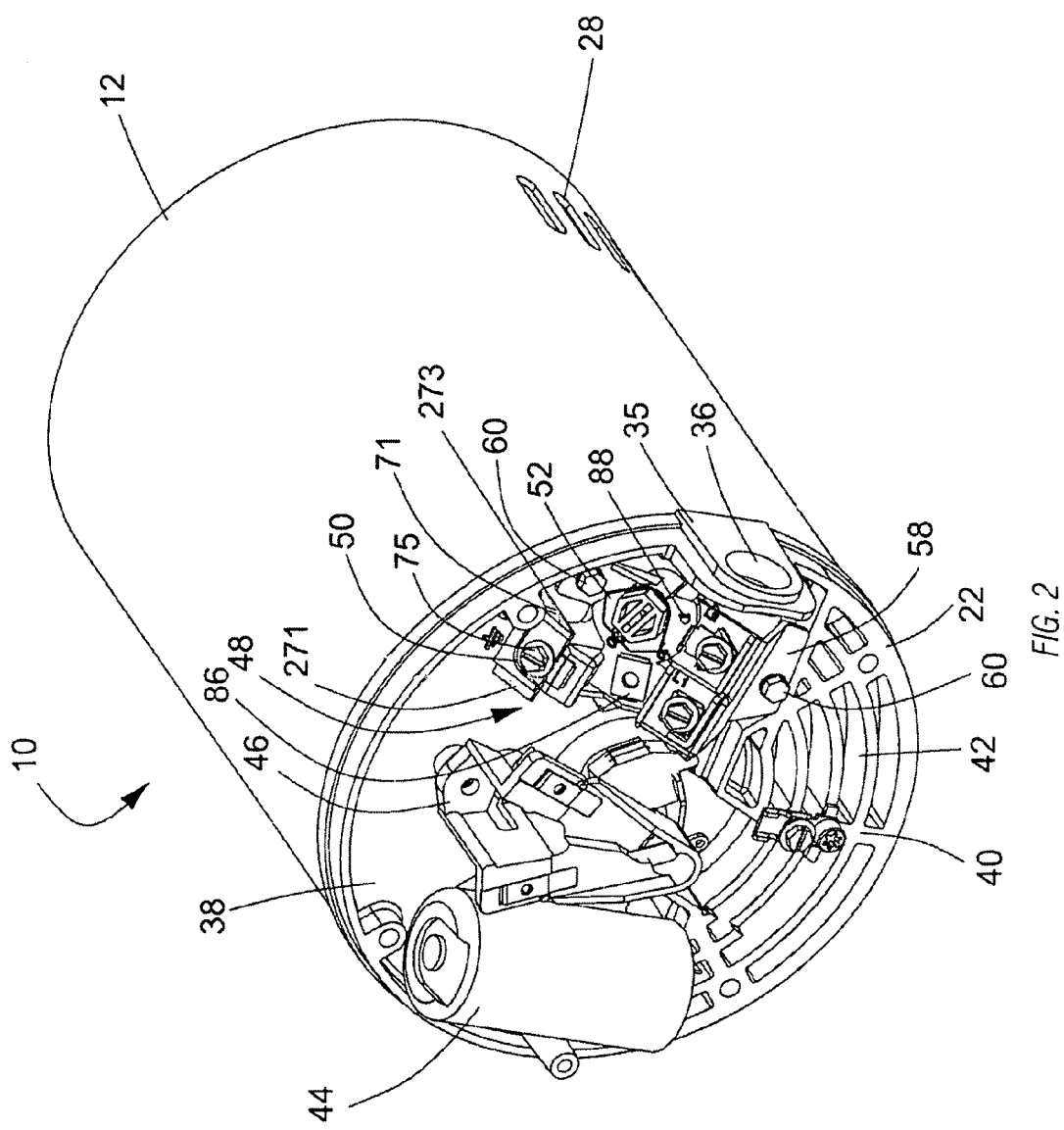
FIG. 2 is a perspective view of the motor of FIG. 1 without a canopy.

As illustrated in FIG. 2, the end frame 22 is coupled to the housing 12 using several screws (not shown). In the illustrated construction, four apertures are formed in the end frame 22 to receive four screws. Other constructions may employ more or fewer screws or may employ a different attachment system entirely.

The end frame 22 includes a flat portion 38 and a ventilation portion 40. The flat portion 38 defines a first plane 41, shown in FIG. 1, which is substantially perpendicular to the axis 18. The ventilation portion 40 includes a plurality of air vents 42, each defining a substantially curved shape. In the construction shown in FIG. 2, the plurality of air vents 42 are arranged concentrically around the center of the end frame 22. In some constructions of the motor 10, the air vents 42 are fluidly connected to the air vents 28 to provide a cooling air flow through at least a portion of the motor 10. Generally, the flat portion 38 of the end flame 22 is substantially covered by the canopy 24, shown in FIG. 1, and supports some components of the motor 10.

In the construction shown in FIG. 2, the flat portion 38 of the end frame 22 supports a first electric component 44 (e.g. capacitor), a start switch 46, and a terminal board 48. The start switch 46 is used to fixedly couple the canopy 24 to the end frame 22. Other components may also be attached to the start switch 46 or directly to the end frame 22 if desired.

Figure 3:
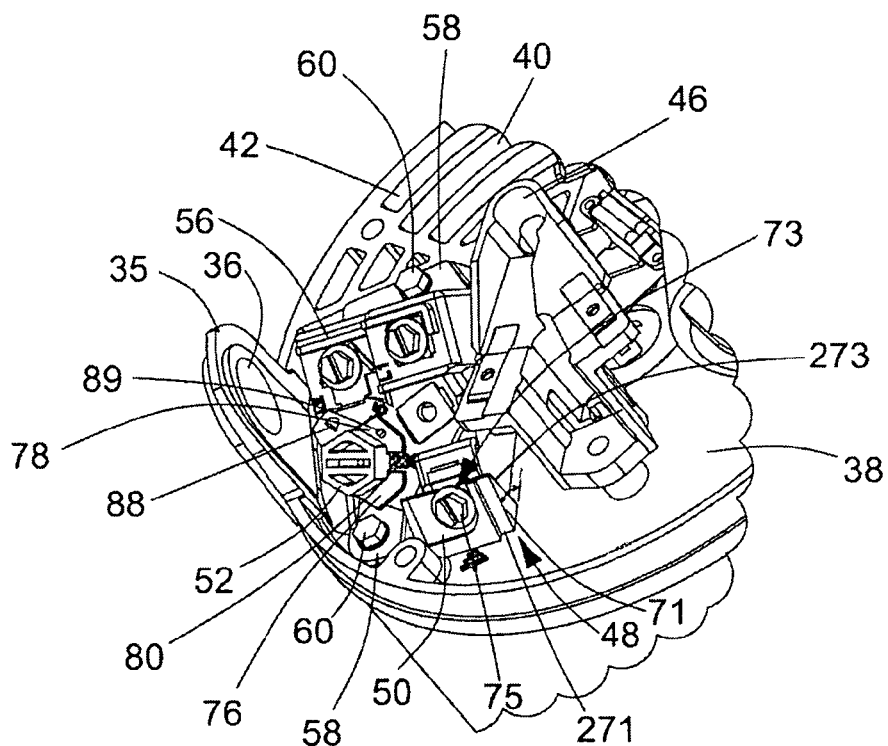
FIG. 3 is perspective view of a terminal board coupled to an end frame shown in FIG. 2.
Figure 4:
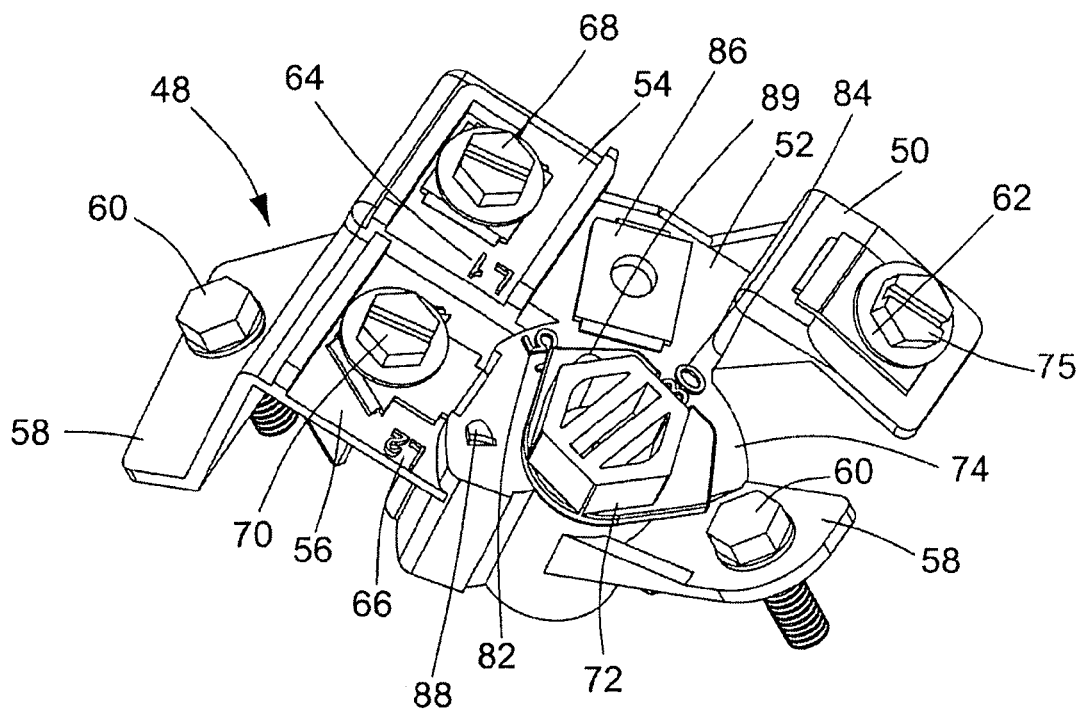
FIG. 4 is a perspective view of the terminal board of FIG. 3.
Figure 5:
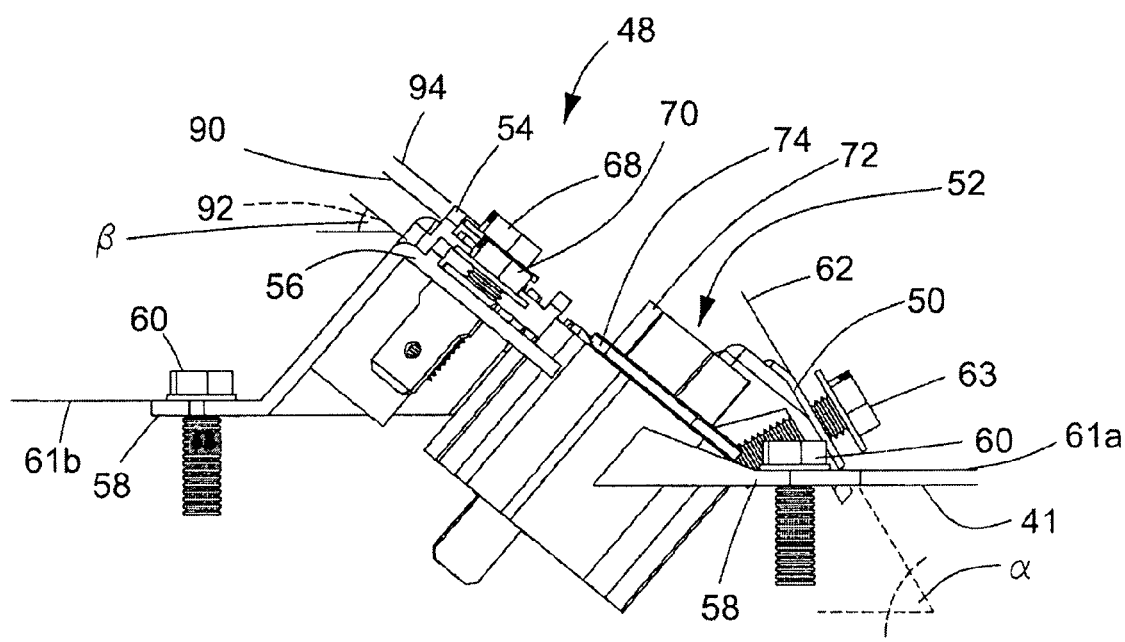
FIG. 5 is an elevation view of the terminal board of FIG. 4.

As shown in FIGS. 2-4, the terminal board 48 includes a grounding portion 50, a voltage change portion 52, a first terminal portion 54, a second terminal portion 56, and two attachment portions 58. The terminal board 48 can be manufactured from any number of suitable materials known to those skilled in the art, but injection molded plastic is generally well suited for use with the subject invention. In the illustrated construction, the terminal board 48 is coupled to the end frame 22 using two screws 60. Each screw 60 extends substantially perpendicular through one of the attachment portions 58. Additionally, as shown in FIG. 5, the attachment portions 58 define a first attachment plane 61a and a second attachment plane 61b. The attachment planes 61a, 61b are parallel to the first plane 41 defined by the end frame 22. In other constructions, it is possible that the two attachment portions 58 are coplanar such that they define a single plane that is parallel to the first plane 41.

As shown in FIG. 5, the grounding portion 50 defines a grounding plane 62 that forms an angle 63 with the first plane 41. The angle 63 is preferably between 40 degrees and 80 degrees, and more preferably is between 40 degrees and 50 degrees. The grounding portion 50 is also adjacent to the voltage change portion 52 and opposite the first terminal portion 54 and the second terminal portion 56. A grounding screw 63 extends through the grounding portion 50 and couples to the end frame 22 perpendicularly with respect to the grounding plane 62. The first terminal portion 54 and the second terminal portion 56 include a first indicator 64 and a second indicator 66, respectively. The first and second indicators 64, 66 are each used to identify the terminals of the terminal board 48. The first terminal portion 54 and the second terminal portion 56 also include a first terminal screw 68 and a second terminal screw 70, respectively, to couple the terminal board 48 to electrical connectors (not shown).

With continued reference to FIG. 2, the end frame 22 includes a wedge portion 71 that, in preferred constructions is integrally-formed as a single piece with the end frame 22. Generally, the end frame 22 is cast from a metallic material such as aluminum, cast iron, or other suitable metals. In these constructions, the wedge portion 71 is cast with the end frame 22.

The wedge portion 71 includes a U-shaped slot 73, a front wall 271, and a rear wall 273 that cooperates with the front wall 271 to define an oblique angle. The front wall 271 is angled with respect to the end frame 22 such that the grounding screw 75, which is substantially perpendicular to the front wall 271, and the first plane 41 define an oblique angle. The oblique angle 275 is preferably between 40 degrees and 80 degrees, and more preferably is between 40 degrees and 50 degrees.

The rear wall 273 is angled such that it is substantially parallel to the grounding portion 50. The U-shaped slot 73 is sized to receive the grounding screw 75 and can be formed during the casting process. Alternatively, the U-shaped slot 73 is formed during a machining operation that follows casting.

When the terminal board 48 is coupled to the end frame 22, the grounding portion 50 contacts the wedge portion 71. The grounding screw 75 is extended slightly such that the wedge portion 71 is sandwiched between the head of the grounding screw 75 and the grounding portion 50. Thus, when the grounding screw 75 is tightened, it holds a grounding wire in position, at least partially attaches the terminal board 48 to the end frame 22, and provides an electrical path between the grounding wire, the end frame 22, and the grounding portion 50 of the terminal board 48.

In reference to FIG. 3, the voltage change portion 52 includes a hexagonal voltage setting head 72 mounted on a substantially planar dial flange 74. The dial flange 74 includes a first dial portion 76 and a substantially similar and opposite second dial portion 78. The first and second dial portions 76, 78 form a notch 80 that functions as a window to allow for visual inspection of a first voltage indicator 82 and a second voltage indicator 84, partially shown in FIG. 4. The first voltage indicator 82 indicates the motor 10 is operating in a 115-volt mode and the second voltage indicator 84 indicates the motor 10 is operating in a 230-volt mode. Other constructions of the motor 10 can include different values of volt modes as well as a different number of volt modes of operation.

As better shown in FIG. 4, the voltage change portion 52 also includes a connector 86 and a voltage setting lock system including a lock member 88. In the illustrated construction, the motor 10 is set to operate in the 230-volt mode, thus the notch 80 helps display the second voltage indicator 84. The motor 10 can be reset to operate in the 115-volt mode by turning the voltage setting head 72 in the counter-clock-wise direction. The dial flange 74 includes an aperture or mating cavity 89 that may or may not go through the flange 74. In the construction shown, the cavity 89 is configured to receive the lock member 88 in response to rotation of the voltage setting head 72 to the 115-volt mode position. One side of the lock member 88 includes a tapered surface and the other side of the lock member 88 includes a substantially vertical straight surface. The tapered surface of the lock member 88 allows the dial flange 74 to displace vertically and engage the lock member 88 as the motor is set to operate in the 115-volt mode. At substantially the same time the notch 80 fully displays the first voltage indicator 82 (indicative of the 115-volt mode), the lock member 88 snaps into the mating cavity, thereby generating an audible sound. The audible sound indicates that the dial flange 74 is locked by action of the straight surface of the lock member 88 within the mating cavity, thus inhibiting the voltage setting head 72 from being turned away from the 115-volt mode of operation accidentally.

As shown in FIG. 5, the first terminal portion 54 defines a plane 90, the second terminal portion 56 defines a plane 92, and the voltage change portion 52 defines a plane 94. The planes 90, 92, 94 are substantially parallel to each other and define an angle 95 approximately between 40 degrees and 80 degrees with the first plane 41. In the illustrated construction, planes 90, 92, 94 are not parallel to the grounding plane 62, though other constructions can include planes 90, 92, 94 parallel to the grounding plane 62. In yet other constructions, the planes 90, 92, 94 and the grounding plane 62 may each define an independent angle with the first plane 41, such that the independent angles are not parallel. In the illustrated construction, the motor 10 is placed horizontally (shown in FIG. 1) such that the first plane 41 is substantially vertical and the terminal board 48 is oriented at an oblique angle (e.g. between 40 and 80 degrees) with respect to the first plane 41. This arrangement makes the terminal board 48 easier to access by a user or a repair technician. In some constructions, at least one of the angles 63 and 95 defines an aperture approximately between 40 degrees and 50 degrees with respect to the first plane 41.

Figure 6:
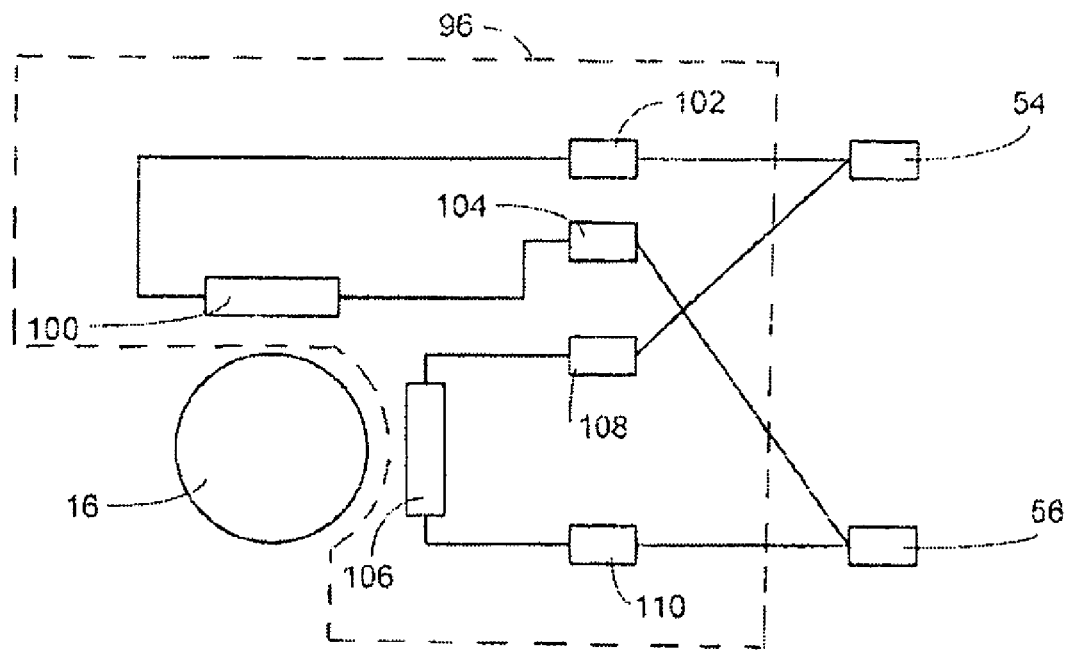
FIG. 6 is a schematic representation of the motor of FIG. 1 illustrating a first winding.
Figure 7:
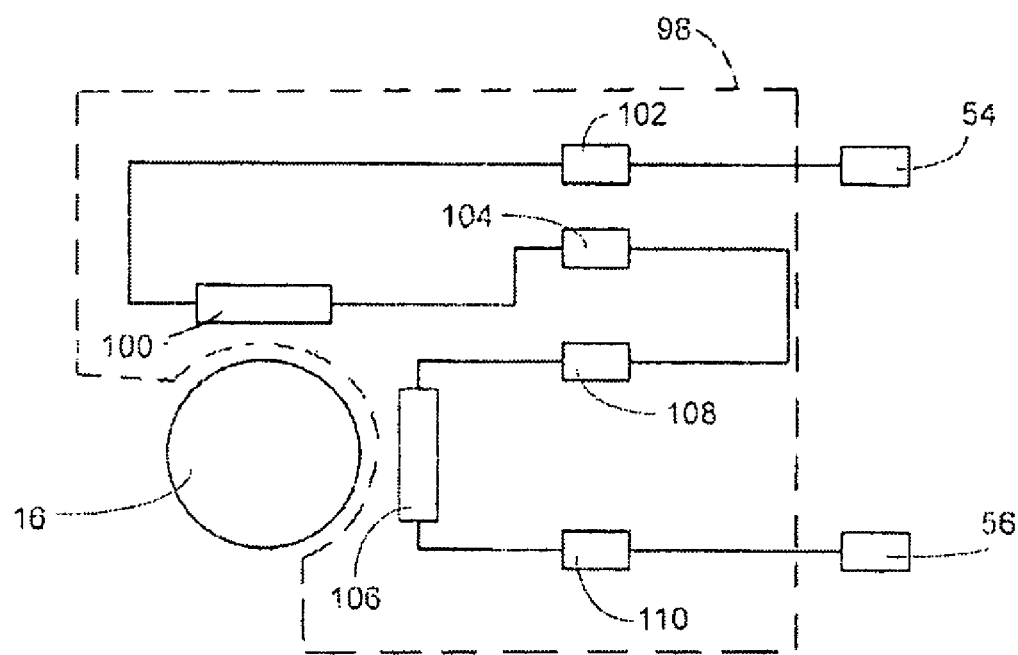
FIG. 7 is a schematic representation of the motor of FIG. 1 illustrating a second winding.

FIGS. 6 and 7 illustrate a first winding 96 and a second winding 98 that can be energized within the motor 10 to produce rotation of the rotor 20. Each winding includes a first coil 100 and a second coil 106. A first terminal 102 and a second terminal 104 provide for electrical connections to the first coil 100 and a third terminal 108 and a fourth terminal 110 provide for electrical connections to the second coil 106. As one of ordinary skill in the art will realize, the coils 100, 106 could include multiple coils if desired. In addition, additional separate coils could be employed if desired. The illustrated construction shows two only coils 100, 106 for simplicity, with other motors including more coils.

FIG. 6 illustrates the electrical connections that define the first winding 96. In this winding 96, the first coil 100 and the second coil 106 are arranged in parallel such that the full voltage applied at the first terminal portion 54 and the second terminal portion 56 is also present across each coil.

FIG. 7 illustrates the electrical connections that define the second winding 98. In this winding 98, the first coil 100 and the second coil 106 are arranged in series such that about half of the voltage applied at the first terminal portion 54 and the second terminal portion 56 is present across each coil.

Thus, as can be seen, the same coils 100, 106 and many of the same electrical components are used to define two individual windings 96, 98 in the motor 10. Each arrangement is such that the same voltage is applied across each coil 100, 106, even when different voltages are applied across the first terminal portion 54 and the second terminal portion 56. The particular winding 96, 98 being employed at any given time is determined by the position of the voltage change device 52. Thus, each motor 10 includes at least two windings 96, 98 and the voltage change device 52 selects which of the two windings 96, 98 is energized during motor operation. While each winding 96, 98 shares electrical components that are energized no matter which winding 96, 98 is selected, the different electrical connections make the operation of the windings 96, 98 and thus the windings 96, 98 themselves distinct. Thus, it should be understood that a motor that includes a first winding and a second winding does not require two separate and distinct windings. Rather, all that is required is that the electrical connections within the motor be rearrangeable to define two or more electrically distinct windings.

In the construction shown in FIG. 6, the first winding arrangement 96 represents schematically the 115-volt mode of the motor 10. A person skilled in the art will recognize that the first winding arrangement 96 disposes the first coil 100 and the second coil 106 in a parallel arrangement. More specifically, the first terminal 102 and the third terminal 108 are electrically connected to the first terminal portion 54. Additionally, the second terminal 104 and the fourth terminal 110 are connected to the second terminal portion 56.

In the construction shown in FIG. 7, the second winding arrangement 98 represents schematically the 230-volt mode of the motor 10. A person skilled in the art will recognize that the second winding arrangement 98 disposes the first coil 100 and the second coil 106 in a series arrangement. More specifically, the first terminal 102 is electrically connected to the first terminal portion 54 and the fourth terminal 110 is electrically connected to the second terminal portion 56. Additionally, the second terminal 104 is electrically connected to the third terminal 108.

Thus, the invention provides, among other things, a new and useful terminal block for an electric machine. The constructions of the terminal block and the methods of manufacturing the terminal block described herein and illustrated in the figures are presented by way of example only and are not intended as a limitation upon the concepts and principles of the invention. Various features and advantages of the invention are set forth in the following claims.

What is claimed is:

1. A terminal board for an electric machine having an end cap defining an end plane, a first winding operable at a first voltage, and a second winding operable at a second voltage different from the first voltage, the terminal board comprising:
    an attachment portion engageable with the end cap and defining an attachment plane that is substantially parallel to the end plane;
    a voltage adjustment portion coupled to the attachment portion;
    a voltage adjustment member coupled to the voltage adjustment portion and movable between a first position and a second position to switch the motor from the first winding to the second winding; and
    a lock member coupled to the voltage adjustment member and operable to emit an audible sound when the voltage adjustment member is moved from the second position to the first position;
    wherein the voltage adjustment portion defines a voltage adjustment plane that intersects the end plane to define an included angle that is between about 40 degrees and 80 degrees.

2. The terminal board of claim 1, further comprising a first terminal portion adapted to receive a first terminal wire and a second terminal portion adapted to receive a second terminal wire, the first terminal portion defining a first terminal plane that is substantially parallel to the voltage adjustment plane.

3. The terminal board of claim 2, wherein the second terminal portion defines a second terminal plane that is substantially parallel to the first terminal plane, and wherein the first terminal plane, the second terminal plane, and the voltage adjustment plane are not coplanar.

4. The terminal board of claim 2, wherein the first terminal portion and the second terminal portion are electrically connected to the first winding when the voltage adjustment member is in the first position, and the first terminal portion and the second terminal portion are electrically connected to the second winding when the voltage adjustment member is in the second position.

5. A terminal board for an electric machine having an end cap defining an end plane, a first winding operable at a first voltage, and a second winding operable at a second voltage different from the first voltage, the terminal board comprising:
    an attachment portion engageable with the end cap and defining an attachment plane that is substantially parallel to the end plane;
    a voltage adjustment portion coupled to the attachment portion;
    a voltage adjustment member coupled to the voltage adjustment portion and movable between a first position and a second position to switch the motor from the first winding to the second winding; and a lock member coupled to the voltage adjustment member and operable to emit an audible sound when the voltage adjustment member is moved from the second position to the first position;

wherein the lock member includes a protrusion formed as part of one of the voltage adjustment member and the voltage adjustment portion and a first aperture formed as part of the other of the voltage adjustment member and the voltage adjustment portion, the first aperture sized to receive the protrusion.

6. The terminal board of claim 5, wherein the first aperture is positioned to receive the protrusion when the voltage adjustment member is in the first position.

7. The terminal board of claim 5, wherein the protrusion includes a straight side surface and a tapered side surface, the tapered side surface adapted to allow movement of the protrusion out of the first aperture, the straight surface adapted to inhibit movement of the protrusion out of the first aperture.

8. A terminal board for an electric machine having an end cap defining an end plane, a first winding operable at a first voltage, and a second winding operable at a second voltage different from the first voltage, the terminal board comprising:

an attachment portion engageable with the end cap and defining an attachment plane that is substantially parallel to the end plane;

a voltage adjustment portion coupled to the attachment portion;

a voltage adjustment member coupled to the voltage adjustment portion and movable between a first position and a second position to switch the motor from the first winding to the second winding; and a lock member coupled to the voltage adjustment member and operable to emit an audible sound when the voltage adjustment member is moved from the second position to the first position;

wherein the voltage adjustment portion includes an indicator indicative of the position of the voltage adjustment member and the voltage adjustment member includes a window that allows for visual detection of the indicator when the voltage adjustment member is positioned in one of the first position and the second position.

* * * * *